Aug. 17, 1965    H. J. SCHWERDHOFER    3,200,669
MULTIPLE SPEED HUB WITH INTERNAL SPEED CHANGING MECHANISM
Filed May 16, 1962    2 Sheets-Sheet 1
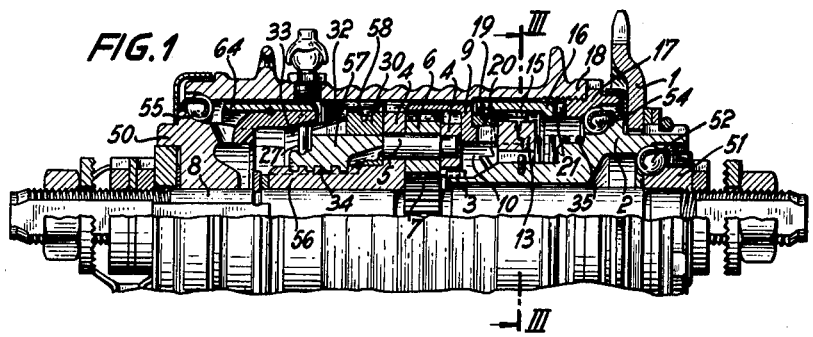
FIG. 1
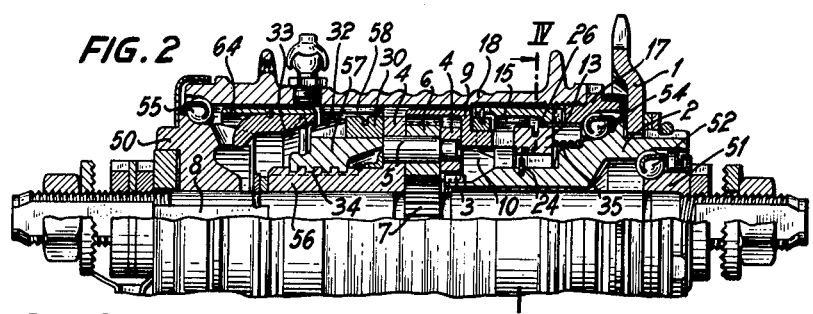
FIG. 2
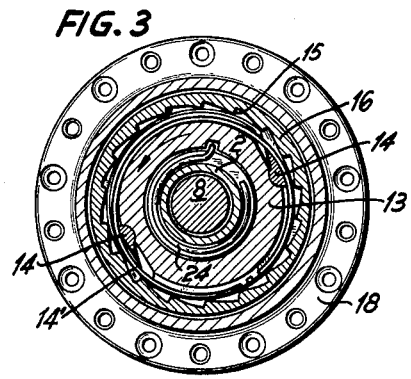
FIG. 3
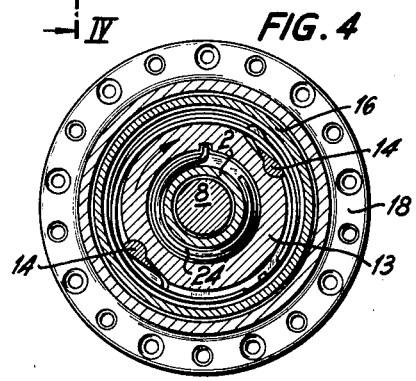
FIG. 4
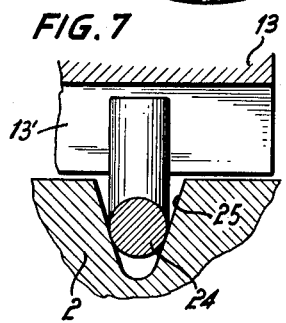
FIG. 7
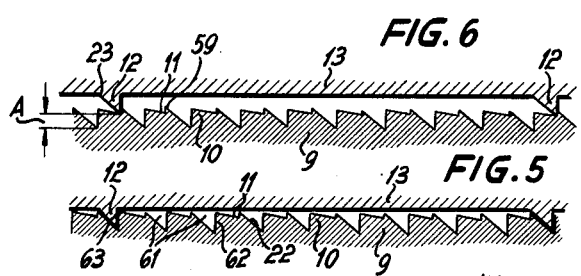
FIG. 6
FIG. 5
INVENTOR
Hans Joachim Schwerdhöfer
By Richard Low agt

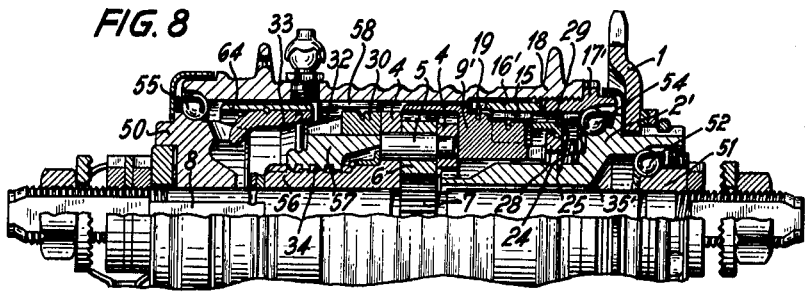
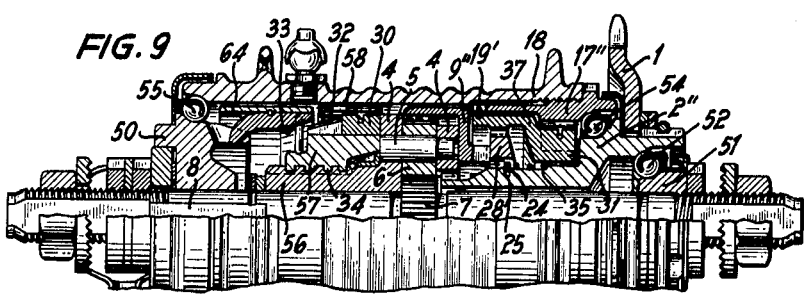
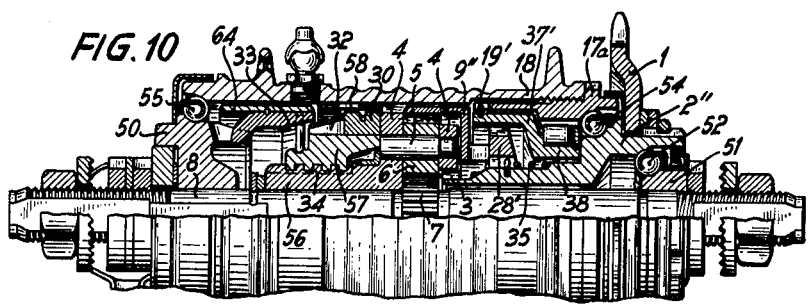
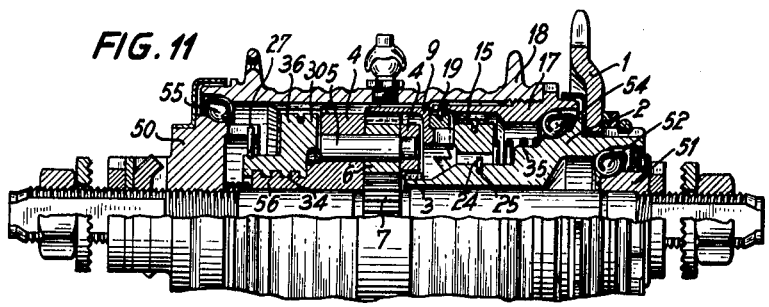

United States Patent Office 3,200,669
Patented Aug. 17, 1965

3,200,669
MULTIPLE SPEED HUB WITH INTERNAL
SPEED CHANGING MECHANISM
Hans Joachim Schwerdhöfer, Schweinfurt (Main), Germany, assignor to Fichtel & Sachs A.G., Schweinfurt (Main), Germany, a corporation of Germany
Filed May 16, 1962, Ser. No. 195,123
Claims priority, application Germany, May 17, 1961, F 33,934
14 Claims. (Cl. 74—750)

This invention relates to wheel hubs for driven wheels of a bicycle or similar vehicle which are equipped with built-in multiple speed transmissions, and more particularly to a bicycle hub in which speed changes are effected by an internal speed changing mechanism actuated by backward rotation of the driven input member of the hub.

Bicycle hubs in which a speed change is initiated by back pedaling are known in themselves. Such hubs are conventionally equipped with planetary gearing which provides two alternative output speeds for a given input speed.

The object of this invention is an improvement of the known multiple speed hub with internal speed changing mechanism.

A more specific object is the provision of a multiple speed hub of the type described the constituent elements of which are less numerous than those of hubs manufactured heretofore, and are simple in shape so that they may be produced by relatively inexpensive methods.

With these and other objects in view as will hereinafter appear, the invention provides a hub in which a hub shell is driven from a sprocket through an interposed multiple speed transmission. Two elements of the tranmission are in meshing direct or indirect engagement for rotation at different speeds, one of the elements being connected to the input sprocket. A speed changing clutch in the hub includes a ratchet member and a detent member which are rotatable about a common axis. The ratchet member has several engagement faces which are circumferentially spaced from each other on two axial levels. During rotation of the detent member and the ratchet member relative to each other about the common axis in one direction, the detent member sequentially engages the faces of the ratchet member. These faces are shaped to prevent relative rotation of the two members of the speed changing clutch in the other direction. During relative rotation of the engaged clutch members, they also must move axially relative to each other.

One of the clutch members is connected to one of the aforementioned transmission elements, and the other clutch member is connected to the other transmission element by a clutch when the sprocket is rotated backward, as during back pedaling. Coupling means including two overriding clutches associated with the two transmission elements are arranged in such a manner that a corresponding one of the transmission elements is put into driving connection with the hub shell according to the relative axial position of the members of the speed changing clutch.

The exact nature of this invention as well as other features and advantages thereof will be readily apparent from consideration of the following specification relating to the annexed drawings in which:

FIG. 1 shows a first embodiment of the multiple speed hub of the invention in side elevation, partly in section on an axial plane;
FIG. 2 shows the hub of FIG. 1 in a different speed position;
FIG. 3 is a radially sectional view of the hub of FIG. 1 on the line III—III;
FIG. 4 is a corresponding sectional view of the hub of FIG. 2 on the line IV—IV;
FIG. 5 is a developed partial view of a ratchet coupling of the apparatus of FIG. 1;
FIG. 6 shows the ratchet coupling of FIG. 5 in the position assumed when the hub is in the speed position illustrated in FIG. 2;
FIG. 7 illustrates a detail of FIG. 1 on a greatly enlarged scale; and
FIGS. 8 to 11 respectively show a second, third, fourth, and fifth embodiment of the invention in views corresponding to that of FIG. 1.

Referring initially to FIG. 1, there is shown the rear wheel hub of a bicycle having a stationary shaft 8. The two axial ends of the shaft 8 will be referred to hereinafter as the drive end and the brake end of the shaft. The drive end fixedly carries a bearing member 51, and a bearing member 50 is secured against rotation and axial movement on the brake end of the shaft 8. The radially enlarged drive end of a tubular driver member 2 is supported on the bearing member 51 by a ball bearing 52 and is fixedly fastened to a drive sprocket 1 to which motive power is transmitted during operation of the bicycle by a non-illustrated chain from pedals as is conventional. The brake end of the driver member 2 constitutes a sleeve which is rotatably supported on the cylindrical surface of the shaft 8. The two axial ends of a hub shell 18 are rotatably supported by respective ball bearings 54, 55 on the driver member 2 and the bearing member 50.

Planetary gearing is arranged within the hub shell for transmitting torque from the sprocket 1 to the hub shell 18 alternatively at two speed ratios. A planet wheel carrier 4 is rotatably mounted on the shaft 8 by means of an integral tubular hub portion 56. Three eccentric planet shafts 5 on the carrier 4 rotatably support respective planet wheels 6. Only one wheel 6 and the corresponding shaft 5 are visible in the drawing. The planet wheels 6 simultaneously mesh with a sun wheel 7 fixed on the shaft 8, and with internal teeth of a ring gear 9. The ring gear thus rotates faster than the planet wheel carrier.

Coarse threads 34 on the outer cylindrical face of the hub portion 56 of the planet wheel carrier 4 engage mating internal threads on a brake member 57. The conical face 32 of the brake member 57 is engageable with a conforming internal conical face 33 of a slotted brake sleeve 64 when the brake member 57 moves axially toward the sleeve 64 on the threads 34. Engagement of the faces 32, 33 causes the sleeve to expand radially for frictional engagement with the hub shell 18. The sleeve 64 is secured against rotation relative to the shaft 8 by abutting engagement of a portion thereof with an axial face of the bearing member 50. When the sleeve 64 is expanded, it frictionally connects the hub shell 18 to the shaft 8.

The brake member 57 pivotally carries pawls 30 which cooperate with a ratchet 58 on the hub shell 18. The pawls 30 and the ratchet 58 jointly constitute a pawl clutch which can transmit driving movement from the brake member 57 to the hub shell 18 in one direction only. A wire spring 27 forms a ring which is positioned in an annular groove of the brake member 57 and frictionally grips the brake member. One end of the wire spring 27 extends radially from the groove and engages an axial slot in the brake sleeve 64. The spring 27 thus frictionally hampers rotation of the brake member 57 about the shaft 8.

Motion is transmitted from the sprocket 1 to the planetary gearing by the driver member 2. An external gear rim 3 on the brake end of the driver member 2 coaxially engages a corresponding internal gear rim on the planet wheel carrier 4.

The ring gear 9 carries a fixedly fastened axially projecting annular ratchet 10 which is adapted to cooperate with detents 12 axially projecting from a pawl carrier 13 to form a speed changing clutch. FIG. 5 is a partial developed view of the ratchet 10 and of the cooperating detents 12 in their position of engagement corresponding to the condition of the hub illustrated in FIG. 1. FIG. 6 is a developed view of the ratchet and of the detents in their engaged position corresponding to FIG. 2.

The teeth of the ratchet 10 are separated by gaps 61. Each tooth has a steep flank 62 bordering an adjacent gap 61 and a more gently sloping flank 22 in the other adjacent gap 61. The steep flanks 62 extend substantially in a plane passing through the hub axis. The flank 22 terminates in a tip or short tooth 59. Between the tip 59 and the steep flank 62, each tooth has an engagement face 11 which rises axially outward from a point adjacent the tip 59 toward the flank 62 at a very small angle relative to a plane which is radial with respect to the hub axis. The detents 12 on the pawl carrier 13 conform to the gaps 61. Each detent has a saw tooth shape with an axial flank 62 and a more gently sloping flank 23.

As is better seen from the sectional view of FIG. 3, two pawls 14 are pivotally retained on a peripheral face of the carrier 13 by a pawl spring 14' which urges the pawls 14 into engagement with a ratchet 15 on a ring member 16. The carrier 13 is thus the driven member of a pawl clutch whose driving member is the ratchet 15. Claws axially projecting from the ring member 16 and from an external bearing race member 17 fixed on the hub shell 18 in contact with the ball bearing 54 constitute a claw coupling 21. The claws of the coupling are spaced from each other to provide lost motion between the ring member 16 and the hub shell 18.

A fixed annular projection 20 on the ring gear 9 has a cylindrical surface formed with an annular groove in which a wire spring 19 is received. The spring frictionally engages the projection 20 and has a free radially extending end portion which engages an axial slot in the ring member 16. The spring 19 constitutes a coupling between the ring gear 9 and the ring member 16 which is capable of transmitting a small torque, but yields to permit relative rotation of the ring member 16 and of the ring gear 9 actuated by a larger force.

A conical abutment face 26 on the ring member 16 is axially aligned with the pawls 14. The pawl carrier 13 is being urged by a helical compression spring 35 to move toward the brake end of the hub whereby the detents 12 are pressed against the ratchet 10, and the pawls 14 are kept out of contact with the conical face 26 on the ring member 16. When the pawl carrier 13 is moved toward the drive end of the hub against the restraint of the spring 31, the pawls 14 are pivoted away from their operative position adjacent the ratchet 15 by abutting engagement with the conical face 26. The pawls 14 thus constitute coupling means which couple the hub shell 18 to the ring gear 9 in the relative axial position of the member 10, 12 of the speed changing clutch illustrated in FIG. 5, but not in the position shown in FIG. 6.

As seen in more detail from FIGS. 3, 4, and 7, the pawl carrier 13 is coupled to the driver member 2 by a one-way friction ratchet clutch. The clutch is mainly constituted by a wire spring 24 one end portion of which is bent into an open circular arc and is received in an outwardly flaring annular groove 25 in a cylindrical face of the driver member 2. The diameter of the wire spring 24 is selected to permit wedging engagement with the walls of the groove 25 as shown in FIG. 7. The other end portion of the spring 24 extends radially outward of the groove 25 and is axially movable in a slot 13' of the pawl carrier 13.

The aforedescribed multiple speed hub operates as follows:

When the hub is set for high speed as shown in FIGS. 1 and 5, torque is transmitted from the sprocket 1 in sequence to the driver member 2, the planet wheel carrier 4, the planet wheels 6, the ring gear 9, the ratchet 10, the detents 12, the pawl carrier 13, the pawls 14, the ring member 16, and the hub shell 18 which therefore rotates at a speed higher than that of the sprocket 1. The ratchet 58 overtravels the pawls 30.

The friction ratchet clutch of the spring 24 is arranged in such a manner that normal driving rotation of the pawl carrier 13 at a speed higher than that of the driver member 2 tends to open the arcuate end portion of the spring 24, and thus to reduce the normal frictional grip of the spring 24 on the driver member 2 by releasing it from the walls of the groove 25. Movement of the pawl carrier 13 responsive to the torque transmitted by the ring gear 9 is thus not significantly interfered with by the friction ratchet clutch.

The brake member 57 is urged by the spring 27 to move threadedly into abutting engagement with a radial face of the planet wheel carrier 4 during forward rotation of the sprocket 1, that is, during normal forward pedaling as shown in FIG. 1. Upon reversal of pedal movement and backward rotation of the sprocket 1 and of the planet wheel carrier 4, the retarding effect of the spring 27 causes the brake member 57 to move on the threads 34 toward the brake end of the hub until the conical faces 32, 33 are engaged, and the friction between the sleeve 64 and the hub shell 18 becomes sufficient to stop further back pedaling, and to block rotation of the hub shell 18 on the shaft 8.

Back pedaling also initiates a change in the transmission ratio of the hub. Backward rotation of the driver member 2 rotates the ring gear 9 in a backward direction at a higher speed than that of the pawl carrier 13, and thereby tightens the frictional grip of the spring 24 on the driver member 2. The pawl carrier 13 is prevented from moving at the speed of the ring gear 9, and the detents 12 travel upward along the gentler slopes 22 of the gaps 61 from the position shown in FIG. 5 toward the left until the position seen in FIG. 6 is reached. The axial position of the ring gear 9 is fixed. The movement of the detents 12 from the position of FIG. 5 to that of FIG. 6 thus causes an axial shifting of the pawl carrier 13 toward the drive end of the hub against the force of the spring 35 over the distance A (FIG. 6) into the position illustrated in FIG. 2. During this axial movement, the pawls 14 are pivoted out of range of the ratchet 15 by the conical face 26 of the ring member 16.

In the condition of the hub seen in FIG. 2, torque is transmitted from the sprocket 1 in sequence to the driver member 2, the planet carrier 4, the brake member 57, the pawl 30, the ratchet 58, and the hub shell 18 which thus rotates at the same speed as the sprocket 1.

In the low-speed position of the hub (FIG. 6), the detents 12 are urged by the spring 35 into engagement with the portion of the face 11 contiguously adjacent the tip 59. If back pedaling is interrupted while the detents 12 are in engagement with any other portion of the face 11, they are quickly shifted to the stable position shown in FIG. 6.

The portion of the face 11 adjacent the tip 59 is equidistant in a circumferential direction from the lowermost portions of the two adjacent gaps 61. Continued back pedaling after a speed change from high to low gear, or back pedaling starting in the low gear position thus shifts the hub into high gear in a manner that will be apparent from the preceding description of the down-shifting operation.

Two detents 12 have been illustrated in FIGS. 5 and 6 on the pawl carrier 13, and a smaller number of detents is operative but not desirable. An increase in the number of detents may be resorted to if considered convenient. The position of the ratchet 10 and the detents 12 may be interchanged so that the detents will be mounted on the ring gear 9, but the arrangement specifically illustrated is preferred.

The distance A, the average diameter of the ratchet 10, and the common slope of the flanks 22, 23 determine the angular displacement of the ratchet 1 required for shifting the hub from high into low gear or vice versa. This displacement of the ratchet 1 will be referred to as the speed changing angle. The number of teeth required along the circumference of the ratchet 10 is readily calculated from the dimensional data for any desired speed changing angle of the drive sprocket.

The angular displacement of the sprocket needed for frictionally engaging the hub shell 18 with the shaft 8 is determined by the dimensions of the several hub elements and by the pitch of the coarse threads 34. This displacement, referred to hereinafter as the braking angle of the sprocket wheel 1, may be varied by changing the position of the face of the planet wheel carrier 4 against which the brake member 57 abuts, by varying the pitch of the threads 34, and in other ways which will be apparent to those skilled in the art.

The speed changing angle and the braking angle of the ratchet wheel 1 are preferably correlated in such a manner that braking does not commence before a speed shift by back pedaling is completed. The correlation may be such that the brake becomes effective after a single speed shift or after two consecutive speed shifts. In the first case, the bicycle is in a different speed setting after braking than before braking, and the pedals must be moved backward briefly after release of the brake to restore the hub to its initial condition. In the second case, braking does not affect the speed setting, but completion of a speed change does not become noticeable to the rider by increased resistance of the pedals to further backward movement.

The lost motion provided in the claw coupling 21 prevents blocking of the brake if a bicycle is first braked to a standstill, and then rolled backward. Such a sequence of events is likely to occur before and after dismounting.

The bicycle hub illustrated in FIG. 8 is similar to that shown in FIGS. 1 to 7 in many respects. Those elements of the hub which do not significantly differ from the corresponding elements of the hub described above with reference to FIGS. 1 to 7 have been designated by identical reference numerals, and such elements will be specifically referred to only as far as is necessary for an understanding of the features of the hub of FIG. 8 which are not found in FIGS. 1 to 7.

In the hub of FIG. 8, the driver member 2' is modified only to the extent that the wedge shaped groove 25 is somewhat closer to the drive end of the member 2'. The ring gear 9' is extended toward the drive end of the hub and serves as a carrier for the pawls 14 which cooperate with a ratchet 15 on a modified intermediate ring member 16' for selective driving engagement in a forward direction. The modification of the intermediate ring member 16' includes the omission of the claw coupling 21. A driving connection between the ring member 16' and the outer bearing race member 17' is selectively provided by an externally toothed axially movable coupling sleeve 29 which permanently engages internal teeth on the bearing race member 17' and is urged by a conically helical spring 35' into simultaneous engagement with internal teeth on the ring member 16'. The desired lost motion is provided between the teeth of the sleeve 29 and those on the member 17'.

Movement of the coupling sleeve 29 toward the drive end of the hub into a position in which engagement with the ring member 16' is lost is actuated by a slidable ring 28. The ring 28 carries detents substantially identical with those shown in FIGS. 5 and 6 and cooperating with a ratchet on the ring gear 9' substantially identical with the ratchet 10. The ring 28 is coupled to the driver member 2 by the wire spring 24 partly received in the groove 25.

The embodiment of the invention shown in FIG. 8 operates in the same manner as that illustrated in FIGS. 1 to 7. Back pedaling shifts the ring member back and forth between positions in which the coupling sleeve 29 is respectively in and out of torque transmitting engagement with the ring member 16'. The ratchet 10 and the detents 12 are not elements of the power transmitting train in the hub of FIG. 8.

The additional embodiment of the invention seen in FIG. 9 is so similar to that shown in FIGS. 1 to 7 in many respects that description may be limited to the internal speed change mechanism which shifts the hub between low and high speed upon backward rotation of the sprocket 1.

The ratchet 10 and detents 12 whose relative angular displacement causes a speed shift are mounted in the hub of FIG. 9 on the ring gear 9" and on a coupling member 28' respectively. The coupling member 28' is rotatable on the driver member 2" to which it is connected for one-way rotation by the spring 24 in the manner described above. Cooperating external teeth on the coupling member 28' and internal teeth on a pawl carrier 37 which is the driven member of a one-way clutch are of such axial length that they are engaged and disengaged by shifting of the detents 12 between their two stable positions evident from FIGS. 5 and 6.

The pawls 31 on the pawl carrier 37 transmit torque from the latter to an internal ratchet on the bearing race member 17" which is fixedly fastened to the internal wall of the hub shell 18. An annular friction spring 19' is interposed between the pawl carrier 37 and the hub shell 18.

The bicycle hub shown in FIG. 10 differs from that illustrated in FIG. 9 merely by the provision of clamping rollers 38 which selectively connect a correspondingly modified carrier 37' with the bearing race member 17a which has a smooth inner wall for clamping engagement with the rollers 38. The carrier 37' is selectively engageable with the ring gear 9" by a coupling member 28' in the manner described above.

FIG. 11 shows a bicycle hub the driving and speed changing elements of which are the full structural and functional equivalents of those illustrated in FIGS. 1 to 7. The hub of FIG. 11, however, lacks a coaster brake, and the additional space thus available in the hub shell permits the hub elements to be dimensioned more amply in an axial direction. Since this does not affect their mode of operation, the same reference numerals have been employed for such elements as in FIGS. 1 to 7, and a description of these elements may be dispensed with.

To limit back pedaling to a desired speed changing angle, the threads 34 carry instead of the brake member 57 a blocking member 36 which also acts as a carrier for pawls 30. A wire spring 27 cooperates with the pawl carrying blocking manner in the manner described above with reference to the brake member 57 to threadedly move the blocking member toward the brake end of the hub during back pedaling. Such movement eventually causes abutment of the member 36 against a radial wall of the bearing member 50, thereby making further back pedaling impossible.

By suitably selecting either the pitch of the threads 34 or the axial distance available for movement of the blocking member 36 between respective positions of abutment against the planet wheel carrier 4 and the bearing member 50, one may adjust the speed changing angle of sprocket 1 in such a manner as to permit one or two consecutive speed changes before blocking occurs.

The modified embodiments of the invention illustrated in FIGS. 8 to 11 do not exhaust the variations of the inventions which will suggest themselves to those skilled in the art on the basis of these teachings. It is a common feature of the several embodiments of the invention that they require relatively few movable parts in a multiple speed hub without external speed change mechanism, and that these parts are of such simple shape that they may readily be mass-produced to exacting tolerances by simple and inexpensive manufacturing processes. The multiple-speed hubs of the invention are distinguished by a relatively small diameter and by low weight.

It will be understood that the foregoing disclosure relates to only preferred embodiments of the invention, and that it is intended to cover all changes and modifications of the examples of the invention herein chosen for the purpose of the disclosure which do not constitute departures from the spirit and scope of the invention set forth in the appended claims.

What is claimed is:

1. In a multiple speed hub, in combination:
   (a) sprocket means rotatable about an axis in a forward and in a backward direction;
   (b) rotatable hub shell means; and
   (c) multiple speed transmission means interposed between said sprocket means and said hub shell means for transmitting rotation of said sprocket means in said forward direction to said hub shell means at two alternative speed ratios, said transmission means including:
   (1) two transmission elements operatively connected for joint rotation at different speeds, one of said elements being connected to said sprocket means for rotation therewith;
   (2) a speed changing clutch including a rotatable ratchet member and a rotatable detent member coaxially engaging said ratchet member, said ratchet member having a plurality of engagement face means circumferentially spaced from each other in two axially spaced radially extending planes, and sequentially axially engageable with said detent member during relative rotation of said members about the common axis, said face means being shaped to prevent relative rotation of said members in a direction opposite to said one direction, whereby said clutch members are moved between two axial positions relative to each other during said relative rotation of said members in said one direction, one of said clutch members being connected to one of said transmission elements for joint rotation therewith;
   (3) one-way clutch means selectively responsive to backward rotation of said sprocket means for connecting the other clutch member to the other transmission element for joint rotation therewith in said one direction relative to the other clutch member; and
   (4) coupling means responsive to said relative axial positions of said clutch members for coupling said shell means to a respective one of said transmission members for joint rotation in said forward direction.

2. In a hub as set forth in claim 1, yieldably resilient means for urging said detent member into engagement with said engagement face means.

3. In a hub as set forth in claim 1, a shaft having an axis, said hub shell means and said sprocket means being coaxial with said shaft, said multiple speed transmission means further including sun wheel means on said shaft and planet wheel means engaging said sun wheel means, said transmission elements respectively constituting ring gear means coaxially spaced from said sun wheel means and engaging said planet wheel means, and planet wheel carrier means coaxial with said ring gear means and rotatably carrying said planet wheel means.

4. In a hub as set forth in claim 3, said one clutch member being fixedly fastened to said ring gear means.

5. In a hub as set forth in claim 4, connecting means for connecting said coupling means in at least one of said axial positions of said clutch members to said other clutch member for joint rotation therewith.

6. In a hub as set forth in claim 1, said coupling means comprising a pawl clutch having a driving member, a driven member, and pawl means movably mounted on one of said pawl clutch members and engageable with the other pawl clutch member for selectively transmitting rotary movement therebetween in one direction, said driving member being connected to said other member of said speed changing clutch for joint axial movement; and abutment means axially fixed relative to said one member of said speed changing clutch for moving said pawl means between an operative position in which said pawl means engage said other pawl clutch member and an inoperative position out of engagement with said other pawl clutch means when said driving member axially moves with said other member of said speed changing clutch.

7. In a hub as set forth in claim 6, said abutment means having a conical abutment face having an axis, said driving member being rotatable about the axis of said conical face.

8. In a hub as set forth in claim 1, said coupling means including a one-way clutch having a driving member secured to said hub shell means and a driven member, and engaging means interposed between the driven member of said one-way clutch and said other member of said speed changing clutch for selectively connecting said other member with said driven member for joint rotation when the members of said speed changing clutch are in one of said relative axial positions thereof.

9. In a hub as set forth in claim 1, said coupling including an intermediate member connected to said one transmission member for selective joint rotation in a forward direction, and a coupling member connected to said other member of said speed changing clutch for joint axial movement therewith relative to said one member of said speed changing clutch between an operative position in which said coupling member connects said intermediate member to said hub shell means, and an inoperative position.

10. In a hub as set forth in claim 1, a shaft, said sprocket means and said hub shell means being rotatable relative to said shaft about a common axis; brake means responsive to backward rotation of said sprocket means for frictionally engaging said hub shell means with said shaft, said coupling means including lost motion means.

11. In a hub as set forth in claim 10, circumferentially successive ones of said engagement face means being circumferentially spaced a predetermined distance and axially spaced from each other, said detent member moving said predetermined distance when said sprocket means rotates backward through a predetermined speed changing angle while said speed changing clutch members are respectively connected to said two transmission members for joint rotation, and said brake means responding to backward rotation of said sprocket means through a predetermined braking angle for frictionally engaging said hub shell means, said braking angle being greater than said speed changing angle.

12. In a hub as set forth in claim 1, a shaft, said sprocket means and said hub shell means being rotatable relative to said shaft about a common axis; cooperating abutment means connected to said shaft and to said hub shell means and responsive to backward rotation of said sprocket means to abut against each other for preventing backward rotation of said sprocket through an angle greater than a predetermined angle; circumferentially successive ones of said engagement face means being circumferentially spaced a predetermined distance, said detent member moving said predetermined distance when said sprocket means rotates through a speed changing angle while said speed changing clutch members are respectively connected to said two transmission members for joint rotation, said predetermined angle being greater than said speed changing angle.

13. In a hub as set forth in claim 12, said predetermined angle being smaller than twice said speed changing angle.

14. In a hub as set forth in claim 1, said clutch means including a spring member, said other transmission element having an axis of rotation and being formed with a radially open annular recess having two axially opposite walls flaring radially toward the open side of said recess, said spring member having an annular portion in said recess and normally simultaneously engaging said walls under the resilient tension thereof, and another portion radially projecting from said recess and secured on said other clutch member against rotation about said axis.

References Cited by the Examiner

UNITED STATES PATENTS

| | | | |
|---|---|---|---|
| 2,865,477 | 12/58 | Hood | 74—781 |
| 2,892,521 | 6/59 | Spencer | 74—781 |
| 2,914,152 | 11/59 | Gleasman | 74—781 |
| 2,953,945 | 9/60 | Gleasman | 192—6 |

DON A. WAITE, *Primary Examiner.*